United States Patent
Parker et al.

(10) Patent No.: US 10,975,805 B2
(45) Date of Patent: Apr. 13, 2021

(54) GROUND HYDRAULIC SYSTEM HYPERGOLIC SLUG INJECTION

(71) Applicant: Aerojet Rocketdyne, Inc., Sacramento, CA (US)

(72) Inventors: Douglas Parker, Camarillo, CA (US); Frederick Dodd, Oak Park, CA (US)

(73) Assignee: AEROJET ROCKETDYNE, INC., Canoga Park, CA (US)

( * ) Notice: Subject to any disclaimer, the term of this patent is extended or adjusted under 35 U.S.C. 154(b) by 149 days.

(21) Appl. No.: 16/316,245

(22) PCT Filed: Jul. 11, 2017

(86) PCT No.: PCT/US2017/041436
§ 371 (c)(1),
(2) Date: Jan. 8, 2019

(87) PCT Pub. No.: WO2018/013504
PCT Pub. Date: Jan. 18, 2018

(65) Prior Publication Data
US 2019/0323454 A1    Oct. 24, 2019

Related U.S. Application Data

(60) Provisional application No. 62/360,880, filed on Jul. 11, 2016.

(51) Int. Cl.
*F02K 9/95* (2006.01)
*B64G 5/00* (2006.01)
*F02K 9/42* (2006.01)

(52) U.S. Cl.
CPC .............. *F02K 9/95* (2013.01); *B64G 5/00* (2013.01); *F02K 9/425* (2013.01); *F05D 2220/80* (2013.01); *F05D 2260/85* (2013.01)

(58) Field of Classification Search
CPC ............... F02K 9/95; F02K 9/96; B64G 5/00
See application file for complete search history.

(56) References Cited

U.S. PATENT DOCUMENTS

| | | |
|---|---|---|
| 2,868,127 A | 1/1959 | Fox |
| 3,116,599 A | 1/1964 | Campbell |
| 3,295,322 A | 1/1967 | Atkins et al. |
| 3,443,475 A | 5/1969 | Berton |

(Continued)

FOREIGN PATENT DOCUMENTS

| | | |
|---|---|---|
| DE | 102007036883 | 2/2009 |
| RU | 63757 U1 * | 6/2007 |

OTHER PUBLICATIONS

Gavrilovich et al., "Trailed Filling station, preferredly, for the transport of rocket fuel components and the rocket tank filling at the start", translation of RU 63757U1, Jun. 10, 2007 (Year: 2007).*

(Continued)

*Primary Examiner* — Gerald L Sung

(57) ABSTRACT

An engine start system includes a facility that has a ground based hydraulic pressurization system and a combustor of a liquid propellant rocket engine. The engine is fluidly coupled to the ground based hydraulic pressurization system. The liquid propellant rocket engine is operably detachable from the ground based hydraulic pressurization system.

8 Claims, 2 Drawing Sheets

(56) References Cited

U.S. PATENT DOCUMENTS

| | | | | |
|---|---|---|---|---|
| 3,736,749 | A | * | 6/1973 | Kretschmer .............. F02K 9/52 |
| | | | | 60/734 |
| 5,746,050 | A | | 5/1998 | McLean et al. |
| 2008/0256925 | A1 | * | 10/2008 | Pederson .................. F02K 9/48 |
| | | | | 60/258 |
| 2012/0024421 | A1 | * | 2/2012 | Boutet ..................... B64G 5/00 |
| | | | | 141/311 R |

OTHER PUBLICATIONS

International Search Report for International Application No. PCT/US2017/041436 completed Sep. 12, 2017.

International Preliminary Report on Patentability for International Application No. PCT/US2017/041436 dated Jan. 15, 2019.

* cited by examiner

GROUND HYDRAULIC SYSTEM HYPERGOLIC SLUG INJECTION

CROSS-REFERENCE TO RELATED APPLICATION

The present disclosure claims priority to U.S. Provisional Patent Application No. 62/360,880, filed Jul. 11, 2016.

BACKGROUND

Hydrocarbon-fueled liquid propellant rocket engines have commonly used hypergolic slug injection systems to initiate combustion. Such hypergolic slug injection systems include an engine pressurant system. The pressurant system causes the slug to enter a combustor, where the slug ignites. The pressurant system is typically integral to either the engine or a rocket vehicle that is propelled by the engine. In other words, the pressurant system is launched along with the engine and vehicle.

SUMMARY

An engine start system according to an example of the present disclosure includes a facility that has a ground based hydraulic pressurization system, and a combustor of a liquid propellant rocket engine fluidly coupled to the ground based hydraulic pressurization system. The liquid propellant rocket engine is operably detachable from the ground based hydraulic pressurization system.

In a further embodiment of any of the foregoing embodiments, the liquid propellant rocket engine includes a starter system. The starter system has a supply line connected with the combustor, a valve, and a hypergolic slug held in the supply line between the combustor and the valve, and the ground based hydraulic pressurization system is fluidly coupled with the starter system.

In a further embodiment of any of the foregoing embodiments, the ground based hydraulic pressurization system is operable to provide pressurized hydraulic fluid into the starter system such that the pressurized hydraulic fluid moves the hypergolic slug into the combustor.

In a further embodiment of any of the foregoing embodiments, the facility is a launch facility.

In a further embodiment of any of the foregoing embodiments, the facility is a test facility.

An engine start system according to an example of the present disclosure includes a vehicle and a rocket engine attached to the vehicle. The rocket engine has a combustion chamber and a starter system. The starter system has a supply line connected with the combustion chamber, a valve, and a hypergolic slug held in the supply line between the combustion chamber and the valve. The rocket engine is operable to launch the vehicle. A hydraulic pressurization system is separate from the vehicle and rocket engine such that the hydraulic pressurization system does not launch with the vehicle. The hydraulic pressurization system is configured to fluidly connect and disconnect with the starter system, and the hydraulic pressurization system is operable to provide pressurized hydraulic fluid into the starter system such that the pressurized hydraulic fluid moves the hypergolic slug into the combustion chamber.

In a further embodiment of any of the foregoing embodiments, the hydraulic pressurization system is fluidly coupled to the starter system in a one-way supply.

In a further embodiment of any of the foregoing embodiments, the hydraulic pressurization system is fluidly coupled to the starter system in a two-way supply.

A further embodiment of any of the foregoing embodiments includes a back-pressure orifice upstream of the valve.

In a further embodiment of any of the foregoing embodiments, the hydraulic pressurization system is mobile.

In a further embodiment of any of the foregoing embodiments, the hypergolic slug is triethylaluminum-triethylborane.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
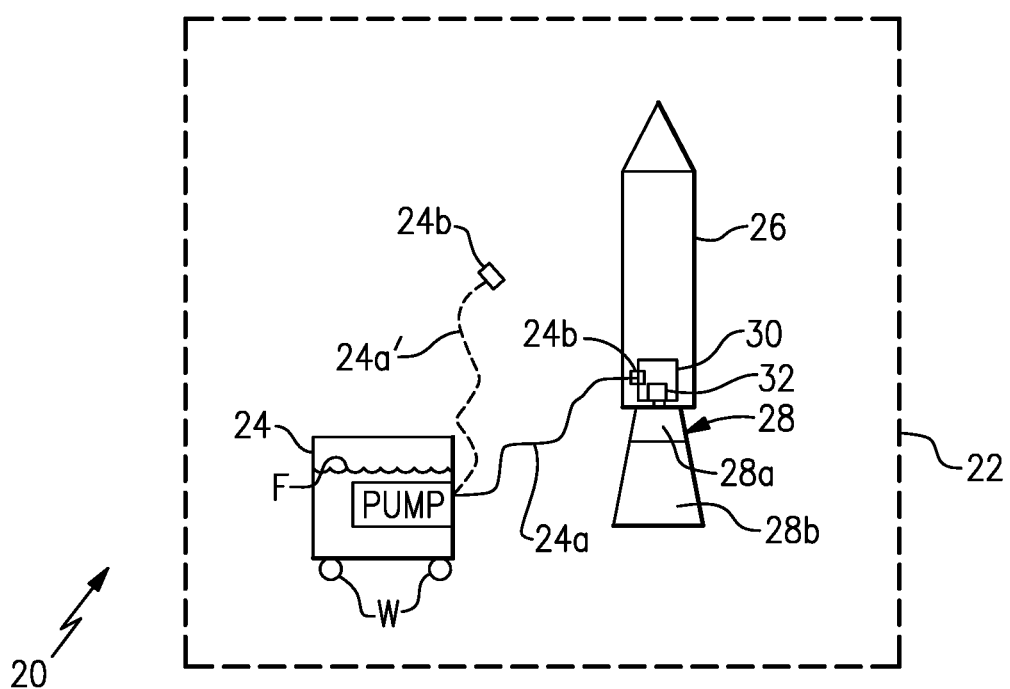
FIG. 1 illustrates a launch system.

FIG. 1 schematically illustrates an engine start system 20. In the illustrated example, the system 20 includes a facility 22 that has a ground based hydraulic pressurization system 24. A vehicle 26 is operably detachable from the ground based hydraulic pressurization system 24 of the facility 22. A rocket engine 28 is attached to the vehicle 26. For instance, when the vehicle 26 is launched, the vehicle 26 mechanically detaches from the ground based hydraulic pressurization system 24. As an example, the facility may be a launch facility, such as a launch pad that is configured for launch of the vehicle 26, or a test facility. A test facility may include structure for mounting the rocket engine 28, without a vehicle.

The rocket engine 28 includes a combustor 28a and a nozzle 28b. The rocket engine 28 is a hypergolic liquid propellant rocket engine. In this regard, the rocket engine 28 includes a starter system 30 that has a hypergolic slug 32. The hypergolic slug may be, but is not limited to, triethylaluminum-triethylborane. The ground based hydraulic pressurization system 24 is fluidly coupled to the rocket engine 28. For example, the hydraulic pressurization system 24 includes a supply line 24a that is fluidly connected to the starter system 30. The supply line 24a may include hose, hard pipe, or combinations of hose and pipe.

The ground based hydraulic pressurization system 24 is separate from the vehicle 26 and rocket engine 28 such that the ground based hydraulic pressurization system 24 does not launch with the vehicle 26. For example, the ground based hydraulic pressurization system 24 is a mobile cart that has wheels, designated at W, that enable movement of the system 24 relative to the vehicle 26 and rocket engine 28. The hydraulic pressurization system 24 may include a tank that is configured to hold hydraulic fluid F and a pump and valves for pressurizing and moving the hydraulic fluid F.

The hydraulic pressurization system 24 is operable to provide the hydraulic fluid F into the starter system 30. The hydraulic fluid F moves the hypergolic slug 32 into the combustion chamber 28a, where the slug spontaneously reacts to initiate combustion in the rocket engine 28.

The rocket engine 28 is operably detachable from the hydraulic pressurization system 24, as shown by the detached supply line 24a' (dashed line). For example, the supply line 24a may include a connector 24b, such as a dry connector, that can be secured to a mating connector on the vehicle 26 or rocket engine 28 to fluidly connect with the starter system 20. Thus, the hydraulic pressurization system 24 may be connected to the vehicle 26 or rocket engine 28 for starting the rocket engine 28, and then disconnected prior to or at launch of the vehicle 26 and rocket engine 28. The ground based hydraulic pressurization system 24 thus eliminates the need for a full pressurant system onboard a rocket engine or vehicle, thereby reducing weight and simplifying design.

Figure 2:
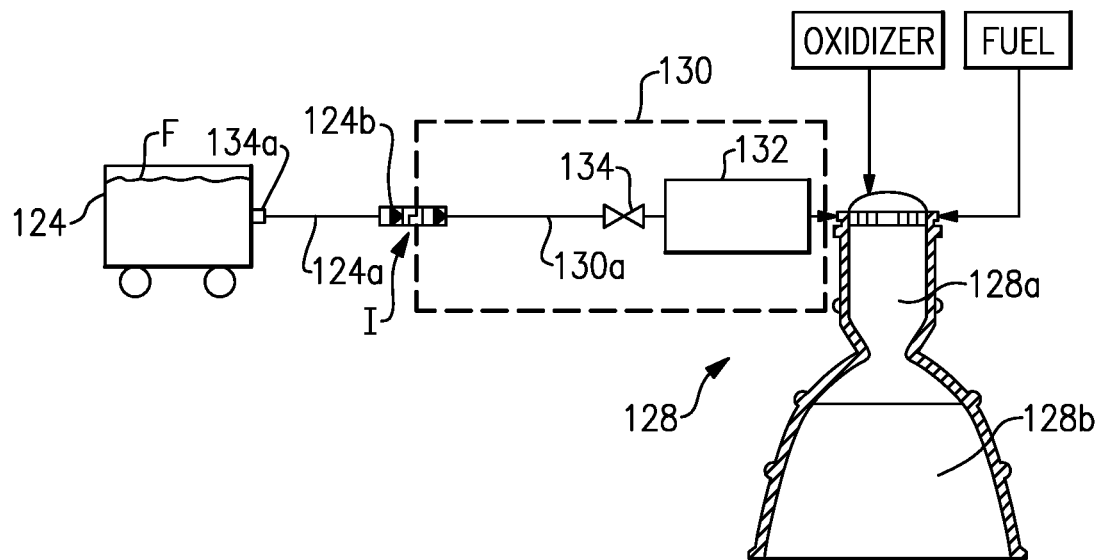
FIG. 2 illustrates a liquid propellant rocket engine and hydraulic pressurization system with a one-way supply.

FIG. 2 illustrates an example of a rocket engine 128. In this disclosure, like reference numerals designate like elements where appropriate and reference numerals with the addition of one-hundred or multiples thereof designate modified elements that are understood to incorporate the same features and benefits of the corresponding elements. The rocket engine 128 includes a combustor 128a, a nozzle 128b, and a starter system 130 fluidly connected with the combustor 128a through supply line 130a.

The starter system 130 includes a valve 134, such as a check valve, and a hypergolic slug 132 held in the supply line 130a between the combustor 128a and the valve 134. The hypergolic slug may be in the form of a cartridge mounted in the supply line 130a.

The ground based hydraulic pressurization system 124 is configured with a supply line 124a to fluidly connect and disconnect via connector 124b, such as a dry connector, with the starter system 130 at a vehicle interface "I." The ground based hydraulic pressurization system 124 is operable to provide pressurized hydraulic fluid F into the starter system 130. For example, upon opening of an ignition valve 134a in the ground based hydraulic pressurization system 130, the pressurized hydraulic fluid F forces the hypergolic slug 132 through the supply line 130a into the combustion chamber 128. The hypergolic slug 132 spontaneously reacts to initiate combustion in the rocket engine 128.

Figure 3:
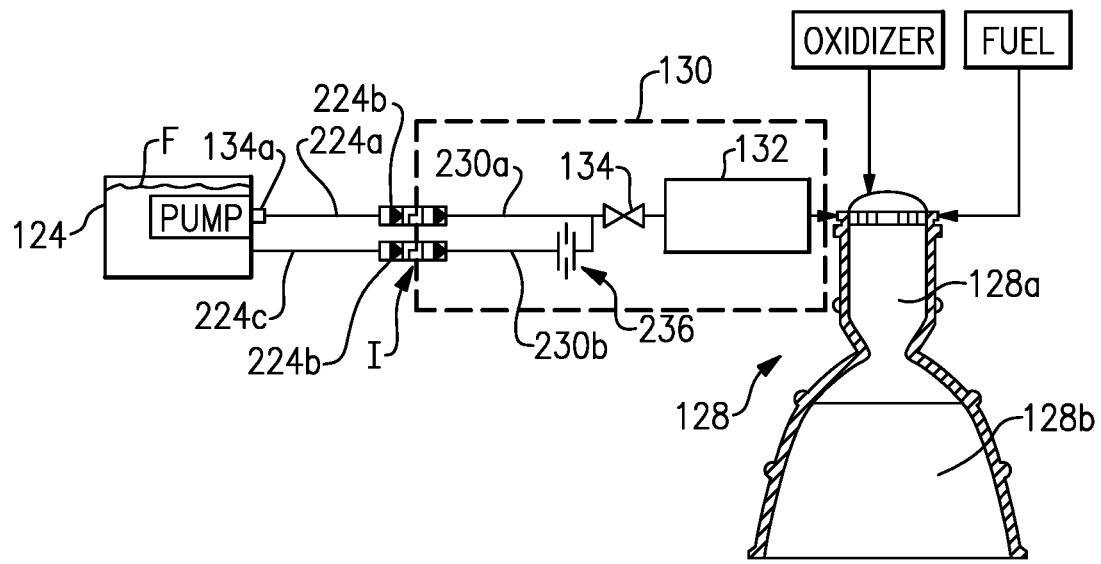
FIG. 3 illustrates a liquid propellant rocket engine and hydraulic pressurization system with a two-way supply.

In this example, the supply line 124a is a one-way supply to the starter system 130. That is, the hydraulic fluid F is delivered to the starter system 130 for a one-time use and does not return to the hydraulic pressurization system 124. Alternatively, as shown in FIG. 3, the ground based hydraulic pressurization system 124 may include a supply line 224a and a return line 224c, i.e., a two-way supply. Each of the supply and return lines 224a/224c may be connected at vehicle interface I via connectors 224b to the starter system 130. Likewise, the starter system 130 includes a supply line 230a, connected with supply line 224a, and a return line 230b, connected with return line 224c. In this example, the return line 230b includes a back-pressure orifice 236 upstream of the valve 134 to limit back-pressure once the ignition valve 134 is opened. The hydraulic fluid F is delivered to the supply line 230a of the starter system 130 via supply line 224a and is returned to the return line 230c via return line 224b. When the ignition valve 134a is opened, the hydraulic fluid forces the hypergolic slug 132 into the combustion chamber 128a to initiate combustion. In this case, a portion or all of the hydraulic fluid may be re-used.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An engine start system comprising:
   a facility having a ground based hydraulic pressurization system comprised of a wheeled mobile cart, a fluid tank, a pump, and an ignition valve; and
   a combustor of a liquid propellant rocket engine fluidly coupled to the ground based hydraulic pressurization system,
   wherein the liquid propellant rocket engine is operably detachable from the ground based hydraulic pressurization system, the liquid propellant rocket engine including a starter system, the starter system including a supply line connected with the combustor, a valve, and a hypergolic slug held in the supply line between the combustor and the valve, the ground based hydraulic pressurization system being fluidly coupled with the starter system, and the hydraulic pressurization system being fluidly coupled to the starter system in a two-way supply.

2. The engine start system as recited in claim 1, wherein the ground based hydraulic pressurization system is operable to provide pressurized hydraulic fluid into the starter system such that the pressurized hydraulic fluid moves the hypergolic slug into the combustor.

3. The engine start system as recited in claim 1, wherein the facility is a launch facility.

4. The engine start system as recited in claim 1, wherein the facility is a test facility.

5. An engine start system comprising:
   a vehicle and a rocket engine attached to the vehicle, the rocket engine including a combustion chamber and a starter system, the starter system including a supply line connected with the combustion chamber, a valve, and a hypergolic slug held in the supply line between the combustion chamber and the valve, the rocket engine operable to launch the vehicle; and
   a hydraulic pressurization system separate from the vehicle and the rocket engine such that the hydraulic pressurization system does not launch with the vehicle, wherein the hydraulic pressurization system is configured to fluidly connect and disconnect with the starter system, and the hydraulic pressurization system is operable to provide pressurized hydraulic fluid into the starter system such that the pressurized hydraulic fluid moves the hypergolic slug into the combustion chamber, wherein the hydraulic pressurization system is fluidly coupled to the starter system in a two-way supply.

6. The engine start system as recited in claim 5, further comprising a back-pressure orifice upstream of the valve.

7. The engine start system as recited in claim 5, wherein the hydraulic pressurization system is mobile.

8. The launch system as recited in claim 5, wherein the hypergolic slug is triethylaluminum-triethylborane.

* * * * *